United States Patent [19]
Bennett

[11] Patent Number: 4,887,909
[45] Date of Patent: Dec. 19, 1989

[54] BLENDER WITH THERMALLY INSULATED CONTAINER

[75] Inventor: James R. Bennett, Fort Lauderdale, Fla.

[73] Assignee: Thermo Blender Inc., Sebastian, Fla.

[21] Appl. No.: 185,021

[22] Filed: Apr. 22, 1988

Related U.S. Application Data

[63] Continuation-in-part of Ser. No. 848,630, Apr. 7, 1986, abandoned.

[51] Int. Cl.$^4$ ............................. B01F 7/00; B01F 7/16
[52] U.S. Cl. .................................... 366/199; 215/12.1; 215/13.1; 366/205; 366/206; 366/314; 366/601
[58] Field of Search ........ 366/197, 199, 149, 204–207, 366/213, 279, 281–284, 314, 601; 215/12.1, 13.1; 99/348; 220/412, 420, 421, 425

[56] References Cited

U.S. PATENT DOCUMENTS

| | | | |
|---|---|---|---|
| 2,577,916 | 12/1951 | Rollman | 366/149 X |
| 2,707,622 | 5/1955 | Vance | 366/149 X |
| 2,913,230 | 11/1959 | Hutchins | 366/205 X |
| 3,175,594 | 3/1965 | Jepson et al. | 366/205 X |
| 3,549,861 | 12/1970 | Trachtenberg et al. | 215/12.1 |
| 3,596,692 | 8/1971 | Swanke | 366/205 X |
| 3,603,364 | 9/1971 | Samuelian | 366/205 X |
| 3,921,961 | 11/1975 | Hapgood | 366/149 X |
| 3,952,538 | 4/1976 | Warlick | 366/149 X |
| 4,487,509 | 12/1984 | Boyce | 366/199 |

Primary Examiner—Timothy F. Simone
Attorney, Agent, or Firm—Alvin S. Blum

[57] ABSTRACT

A thermally insulated blender is comprised of a thermally insulated cover and container. The container has a bottom opening in which is sealably mounted a rotatable vertical driven shaft in a sealed bearing assembly. A base unit has a motor mounted within a housing. The top of the housing is adapted for receiving the bottom of the container in operating position. A vertical driving shaft extends from the top of the motor through an aperture in the top of the housing and engages the driven shaft in the container. A blade assembly on the driven shaft coacts with the contents of the container when the motor is actuated. Cold mixtures will remain cold in the container for prolonged periods.

5 Claims, 3 Drawing Sheets

BLENDER WITH THERMALLY INSULATED CONTAINER

This is a continuation in part of application Ser. No. 848,360 filed 4/7/86, now abandoned.

FIELD OF THE INVENTION

This invention relates generally to electrically powerd rotary food processors and more particularly to an electric blender with thermally insulated container for operation on twelve volt battery power on boats, house trailers and the like.

BACKGROUND OF HE INVENTION

Relevant prior art is disclosed in U.S. Pat. No. 3,549,861 showing a self-heating insulated bottle. Also of interest is U.S. Pat. No. 3,129,318, a thermally insulated coffee percolator, U.S. Pat. No. 3,596,692 for a blender coupling and U.S. Pat. No. 3,175,594 for a blender with special cooling of the motor.

Blender containers of the prior art make no provisions for maintenance of the temperature of the contents. The container walls are generally of a single layer of plastic or metal. The agitation of the contents further enhances the heat transfer through the container walls. When cold contents ae blended, the outer surfaces of the container may be cooled below the dew point, causing condensation of moisture on the outer walls. Cold drinks in containers of the prior art do not remain cold for long.

SUMMARY OF THE INVENTION

It is accordingly, an object of the invention to provide a thermally insulated container with a thermally insulated top cover that will maintain the contents at desired temperature for prolonged periods and that can be used with conventional blender motors and bases.

The blender of the invention includes a thermally insulated container with a top opening, and a thermally insulated cover that may, in an alternative embodiment, also serve as an insulated cup. Through the bottom of said container is disposed an opening with a vertical central axis to accomodate a vertical, rotatable first shaft and bearing arrangement as commonly used with an electric blender container. Connected to the upper end of said shaft are a plurality of blade means for coaction with material within the cavity of said container. Connected to the lower portion of said shaft is an internal axial recess shaped for concentric mating with a second or driving shaft from below. The container may be made of an outer wall of polypropylene or other suitable plastic and an inner wall of the same material generally conforming to the shape of said outer wall, closely spaced therefrom and joined integrally therewith at its upper end. A handle may be connected to the outside of said outer wall. An insulated cup may form the lid or cover. It may connect to the top opening by threaded engagement.

Foam insulating material is used in the space between the inner and outer walls. Alternative insulating means may be used, including an airspace or a partially evacuated space.

A base is also provided, with an internal cavity for housing an electric motor as well as for supporting said container. Said base may be of any desired shape and has an upper surface adapted for supporting said container in operating position.

An electric motor is connected within the internal cavity together with electrical connecting means, such as wiring, thermal overload switch for deactivating said motor when overheated, switching means for selectively activating said motor and plug means for plugging into a power source. An output shaft extends vertically from said electric motor disposed through an aperture in the upper surface of said base. When the blender container is operationally positioned on said upper surface, said output shaft engages said recess in said first shaft in male/female mating connection. When the electric motor is activated, the output shaft rotates at high speed causing the blender shaft and blades to rotate. Once a concoction has been prepared, the thermal insulating feature of the invention allows said concoction to remain at a near constant temperature. These and other objects and advantages of the invention will become evident from the following detailed description of the presently preferred embodiments thereof with reference to the appended drawings in which:

DETAILED DESCRIPTION OF THE PREFERRED EMBODIMENTS

Figure 1:
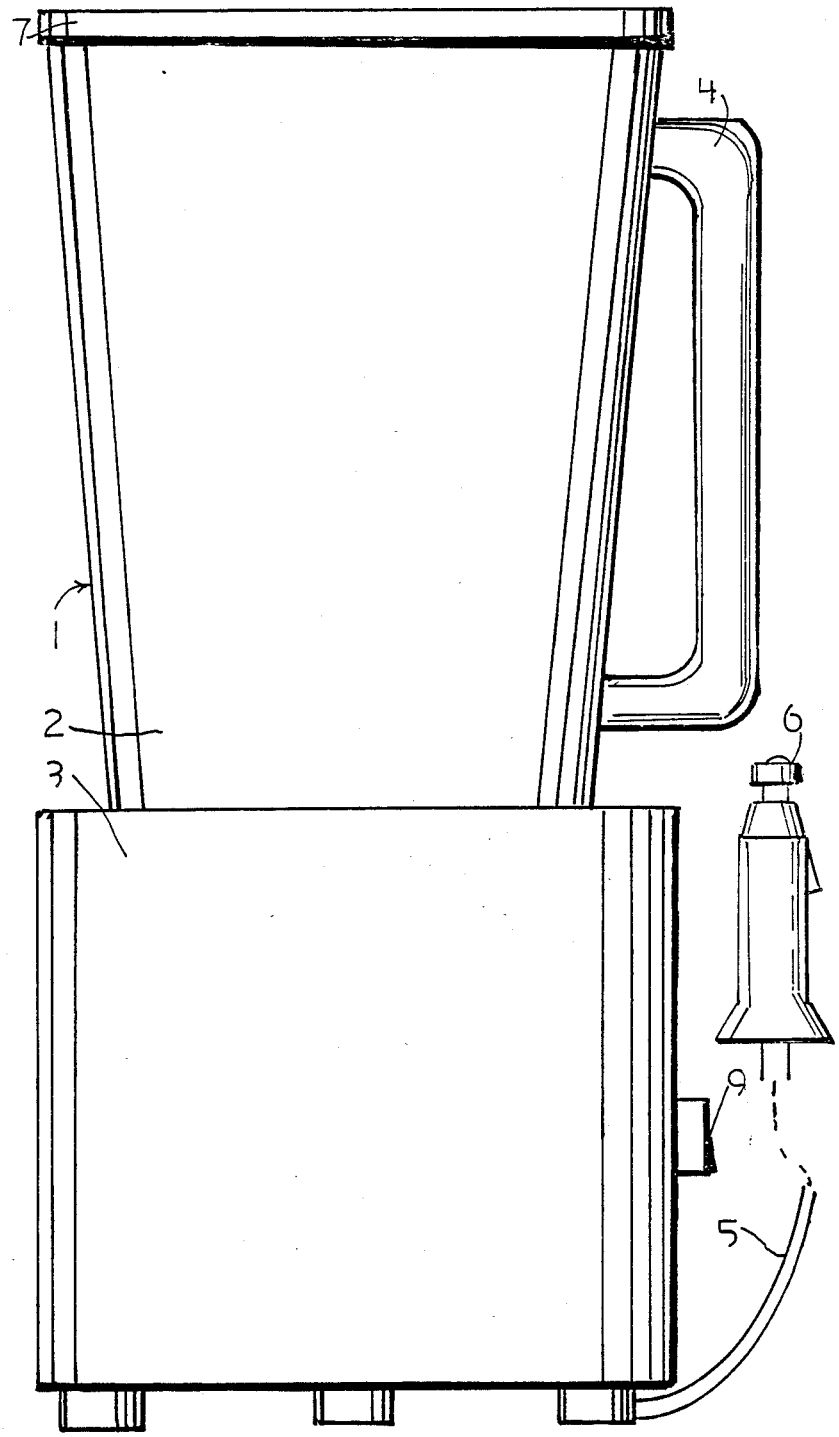
FIG. 1 is a front elevation view of a blender of the invention.

Referring now to FIG. 1, a blender 1 of the invention comprises a container 2, with handle 4 and lid 7, adapted to fit upon base 3 which encloses an electric motor actuated by switch 9 and powered by electric cord 5 with plug 6 for plugging into a cigar lighter such as found on the control panel of a boat, truck or automobile.

Figure 2:
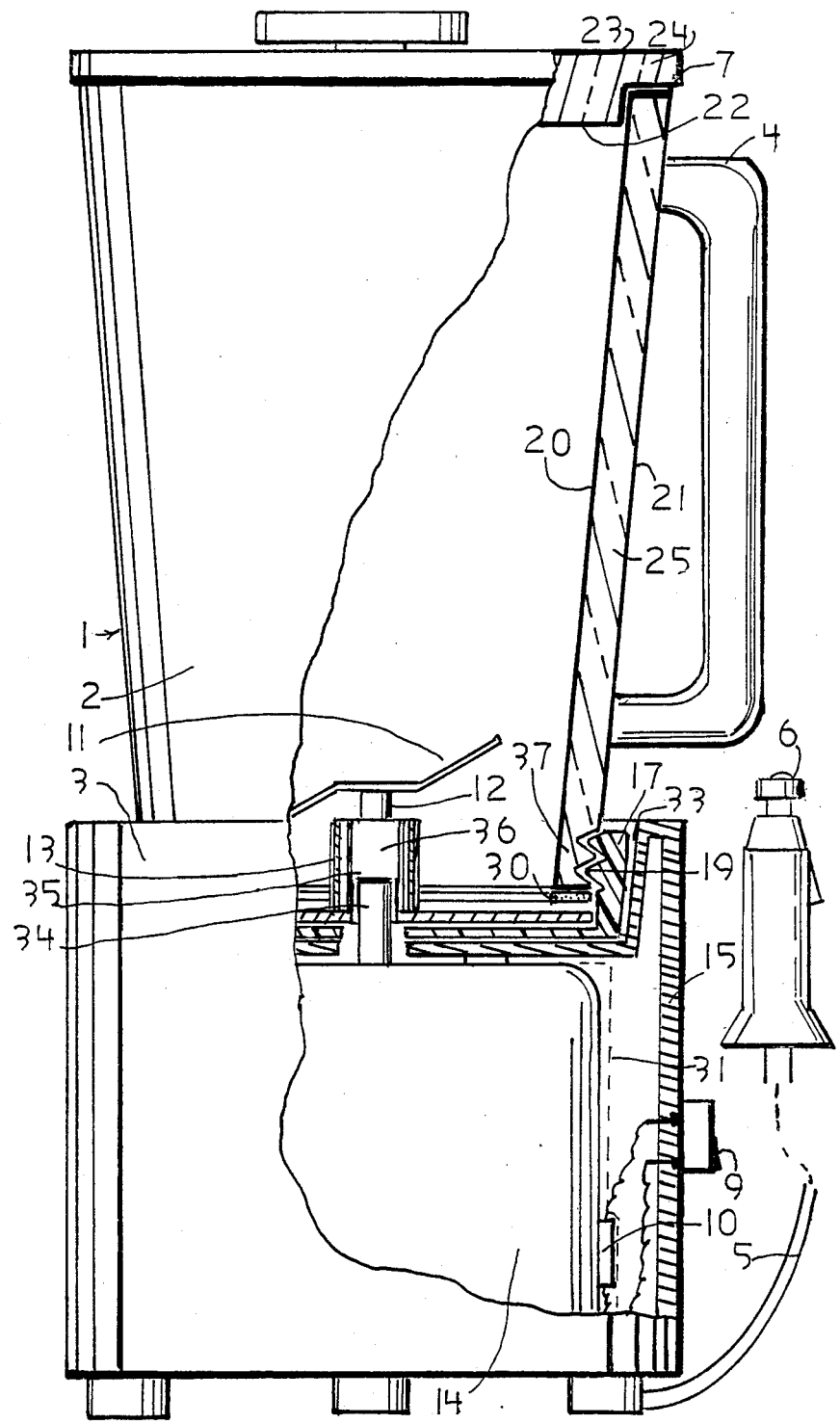
FIG. 2 is a front elevation view of the blender of FIG. 1 with a portion broken away to show details of internal structure.

Referring now to FIG. 2, a portion of the outer coverings of container 2, base 3 and lid 7 have been broken away to reveal internal structural details. The base 3 includes an outer housing 15 with a recess 33 into which container 2 is adapted to fit securely to support the container during operation and to ensure operational engagement of the male driving shaft 34, driven by electric motor 14, and the female member 35 at the downward facing portion of driven shaft 36. At the uppermost portion 12 of driven shaft 36, a blade assembly 11 is fixedly attached and, when motor 14 is actuated, the driving shaft 34 rotatably drives the driven shaft 36 and blades 11 to coact with the contents of container 2. The driven shaft 36 is rotatably mounted in bearing assembly 13. A lower ring 17 threadably engages by threads 19 the lowermost portion 37 of container 2 and bearing assembly 13 with resilient gasket 30 forming a liquid tight seal therebeteen. The blades 11, driving shaft 34, driven shaft 36, male/female coupling, bearing housing 13 and threadably engaging lower ring 17 and gasket 30 are conventional and well known in the blender art.

The container 2 is constructed of a thin inner wall 20 of polypropylene or other suitable plastic material, a thin outer wall 21 of polypropylene or other suitable plastic material, separated by thermally insulating space 25 the hatching symbolizing thermal insulation that may be an air space, a partially evacuated space or a space filled with a foam or other material of a much lower thermal conductivity than the walls to effectively insulate the container contents. The lid 7 likewise has inner wall 22 and outer wall 23 of a suitable plastic with insulating space 24 therebetween.

Figure 3:
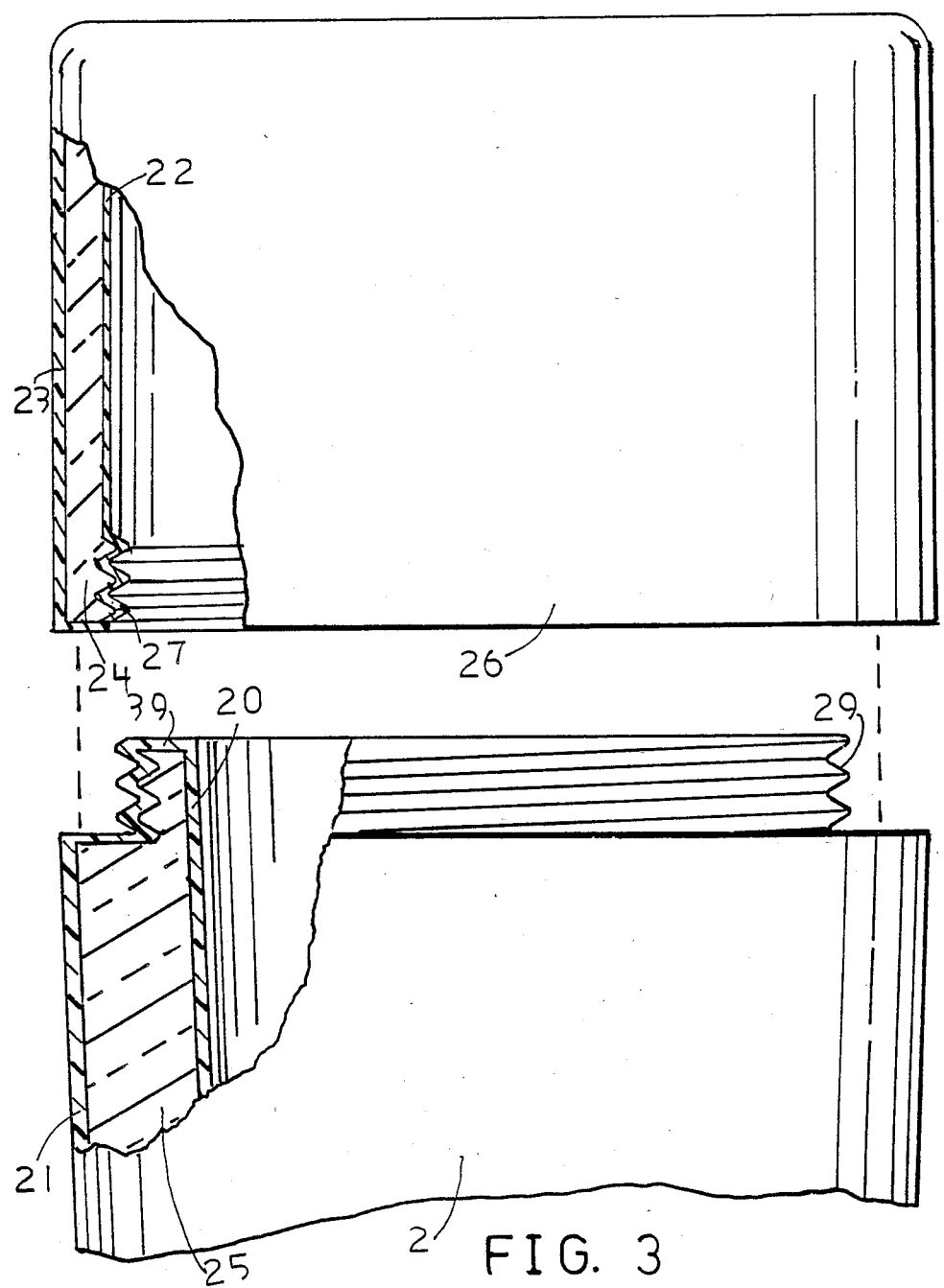
FIG. 3 is a front elevation detail view of a portion of the container and cover of an alternative embodiment of the invention wherein the cover also serves as a cup with a portion broken away to reveal internal detail.

The insulated structure is more clearly illustrated in the detail of FIG. 3 wherein a cup-shaped cover 26 is constructed with thin inner wall 22 and outer wall 23 enclosing insulated space 24. A threaded lower portion 27 threadably engages threaded upper portion 29 of container 2 to seal the cup 26 liquid-tight on container 2. The container 2 has thin inner wall 20 and outer wall 21 enclosing insulating space 25. The inner and outer walls are sealably joined at top and bottom to prevent penetration of the insulating space 25. The top seal 39 is best illustrated in FIG. 3. The bottom seal is similarly constructed.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A thermally insulated blender container for use in conjunction with a conventional blender base and a mounting attachment bearing rotary cutting blades, said blender container comprising:

a vertical central chamber having an open top and an open bottom, said chamber defined by a pair of concentric, enclosing vertical walls, said pair of vertical walls including a rigid inner wall and a rigid outer wall, said outer wall spaced apart from said inner wall by a thermally insulated space of a thickness greater than that of said inner and said outer wall and having a thermal conductivity less than that of said walls;

said open top having lid-engagement means for engagement of a sealing top lid; and said open bottom having a round configuration and provided with external thread means for removable engagement of said mounting attachment to thereby provide an insulated blender using existing blender equipment.

2. The container according to claim 1, in which said thermally insulated space contains a low density foam insulation material.

3. The container according to claim 1, in which said thermally insulated space is a partial vacuum.

4. The container according to claim 1, further including an insulated sealing top lid including a rigid inner member, and a rigid outer member spaced apart by a thermally insulated spaced.

5. The container of claim 4, in which said top lid is in the form of a cup.

* * * * *